United States Patent [19]

Nelson

[11] Patent Number: 5,523,636
[45] Date of Patent: Jun. 4, 1996

[54] ELECTROMAGNETICALLY CONTROLLED GEAR ENGAGEMENT MECHANISM INTEGRATED WITH A MAGNETIC HYSTERESIS SLIP CLUTCH

[75] Inventor: Marvin D. Nelson, Savage, Minn.

[73] Assignee: Honeywell Inc., Minneapolis, Minn.

[21] Appl. No.: 249,561

[22] Filed: May 26, 1993

[51] Int. Cl.[6] .......................... H02K 49/04; H02K 7/10
[52] U.S. Cl. ............................. 310/103; 310/105; 310/83
[58] Field of Search ..................................... 310/73 D, 83, 310/103, 105, 191, 209

[56] References Cited

U.S. PATENT DOCUMENTS

| | | | |
|---|---|---|---|
| 1,136,279 | 4/1915 | Severy | 310/105 |
| 3,584,975 | 6/1971 | Frohbieter | 310/104 |
| 3,636,277 | 1/1972 | Pohler | 310/103 |
| 4,137,473 | 1/1979 | Pfister | 310/103 |
| 4,535,261 | 8/1985 | Tsukamoto et al. | 310/209 |
| 4,542,812 | 9/1985 | Westley | 192/20 |
| 4,553,056 | 11/1985 | Pfister | 310/80 |
| 4,572,333 | 2/1986 | Westley | 188/184 |
| 4,885,489 | 12/1989 | Stuhr | 310/105 |
| 5,032,736 | 7/1991 | Isozumi et al. | 290/48 |
| 5,105,928 | 4/1992 | Saeki et al. | 310/103 |

FOREIGN PATENT DOCUMENTS 1478666  6/1977  United Kingdom .

OTHER PUBLICATIONS

Design and Application of Hysteresis Clutches, Electrical Manufacturing, Dec. 1957.

Permanent Magnet Couplings by C. J. Fellows (date believed to be 1979).

Dauermagnetische Kupplungen Einteilung, Wirkungsweise und Dimensionierung, DEW–Technische Berichte, 1962 by Paul Gernhardt.

Soviet Inventions Illustrated 91-123877/17 (Electric Power Engineering p. 24, Week 9117).

Primary Examiner—Clayton E. LaBalle
Attorney, Agent, or Firm—Edward L. Schwarz

[57] ABSTRACT

A mechanism for transferring torque from a motor to a gear train through a magnetic hysteresis slip clutch has a feature for disconnecting the motor from the gear train. A cup element of the clutch is carried on a shaft and can be shifted along the shaft's axis. The cup element has a magnetic member on its outer surface and an interior hysteresis layer. An electromagnet can magnetically apply force to the magnetic member to axially shift the cup element, and by so doing can shift a drive gear carried on the cup element into and out of mesh with a first gear of the gear train. In a preferred embodiment, the cup element shifts the drive gear into mesh with the gear train's first gear when the electromagnet is energized and magnetically applies force to the magnetic member, and allows magnetic force applied to the hysteresis layer by a permanent magnet element of the clutch to shift the drive gear into its unmeshed position when the electromagnet is deenergized and does not apply force to the magnetic member.

14 Claims, 3 Drawing Sheets

ELECTROMAGNETICALLY CONTROLLED GEAR ENGAGEMENT MECHANISM INTEGRATED WITH A MAGNETIC HYSTERESIS SLIP CLUTCH

BACKGROUND OF THE INVENTION

Mechanical actuators are used in a variety of applications for operating devices such as valves, dampers, doors, etc. Such actuators are used in applications requiring a high level of either torque or linear force. Actuators may be designed to provide their output in either form, which can then be converted to the other by a number of different mechanisms such as a crank arm or rack and pinion. Internally, these actuators typically include a small electric motor driving a reduction gear train for providing the high torque or force output necessary. Typical reduction gear train ratios may be on the order of 1000:1. It is frequently required to limit or control output torque or force, and one way that this is accomplished is by placing a torque limiting or overriding slip clutch at the motor output shaft. When a load requires more torque or force than the design value of such a clutch, the clutch simply slips. In many cases it is important to limit force applied to the controlled device to prevent damage to it.

One type of slip clutch that is often used in low torque situations as a torque-limiting coupling between first and second coaxial shafts such as a motor shaft and the gear train input shaft of an actuator, is the so-called magnetic hysteresis clutch. Such a clutch has a cylindrical armature formed of material with high magnetic remanence and in which an alternating north-south magnetic pattern is permanently formed around its periphery. The armature is mounted for rotation on a first shaft. A cup which is mounted for rotation on a second shaft coaxial with the first shaft, closely fits around the armature's periphery. A special magnetic hysteresis layer is present on the interior cylindrical surface of the cup. As the magnet rotates, it creates a magnetic field in the hysteresis layer which opposes that of the armature. The opposing magnetic fields transfer torque in either direction through the clutch. By properly selecting the strength of the armature's magnetic field and the physical dimensions of the cup and armature, the maximum torque which the clutch can transfer can be controlled relatively accurately. In the actuator application, the torque is transferred by the clutch from the motor to the input gear of the gear train.

A further requirement in some actuator designs is the ability to return the controlled device to a preselected position when an electric power outage occurs. For example, if the controlled device is a fuel valve, when power is lost the valve must be immediately closed to prevent escape of fuel in an uncontrolled manner. One common means for this power out return function is a strong coil spring which is wound or kept wound when the output element moves away from the preselected position, and then is released when a power outage occurs to provide an alternative source of torque for the gear train. The spring-generated torque is then applied to the gear train to return the actuator output element to the preselected position.

Certain types of motors often used in these actuators have cogging torque which resists torque applied to the motor shaft from an external source. Where a coil spring is used for power out return torque for an actuator using such a motor, it is necessary to disconnect the motor from the gear train during spring-powered return. If coupled to the input of the gear train during return operation, such a motor provides resistive torque to the input shaft of the gear train which prevents a spring from returning the output element to its preselected position. Even if the motor does not have cogging torque, its position at the input shaft of the gear train will provide sufficient mechanical drag to require a much larger spring than would otherwise be necessary.

Accordingly, it is necessary in some designs to provide a means of disconnecting the drive motors from the gear train input shafts of the actuators of which they form a part. There are now various types of power operated clutches which can perform this function. However, these devices are relatively complex and expensive, so an inexpensive and simple type of disconnect feature for the motor shaft from the gear train in an actuator would be advantageous.

BRIEF DESCRIPTION OF THE INVENTION

The subject matter of my invention allows electrical control of torque transfer between a first shaft mounted for rotation on a housing, through a magnetic hysteresis slip clutch to a second gear mounted for rotation on the housing. As explained above, the slip clutch comprises a magnetized armature mounted on the first shaft and fixed thereto, and a hysteresis layer within a cylindrical cup surrounding the magnetized member and in torque-transferring relation thereto. The cup is mounted for rotation about its axis with respect to the housing.

My invention is an improvement to this conventional arrangement, and comprises means mounting the cup for allowing axial translation of the cup between first and second positions. A first gear concentric with the first shaft is fixed to the cup for axial translation therewith, meshing with the driven gear when the cup is in its first axial position and out of mesh with the second gear when the cup is in its second axial position. The cup includes a magnetic member externally fixed thereto. An electromagnet in juxtaposition to the magnetic member when energized, generates magnetic flux which flows through a flux path which includes the external magnetic member. The magnetic flux urges the cup into one of the first and second axial positions when said electromagnet is energized.

I prefer that electromagnet is positioned with respect to the magnetic member such that when the electromagnet is energized, the cup is urged into its first position, with the first gear in mesh with the second gear and the armature partly withdrawn from the cup. The armature, being magnetic, exerts magnetic force on the magnetic member, drawing the cup toward its second position which places the armature more fully into the cup, and the first gear out of mesh with the second gear.

BRIEF DESCRIPTION OF THE DRAWINGS

FIG. 3 is a section view at right angles to that of FIGS. 1 and 2 and shows the spatial relationship of the armature and the cup.

DESCRIPTION OF THE PREFERRED EMBODIMENTS

Figure 1:
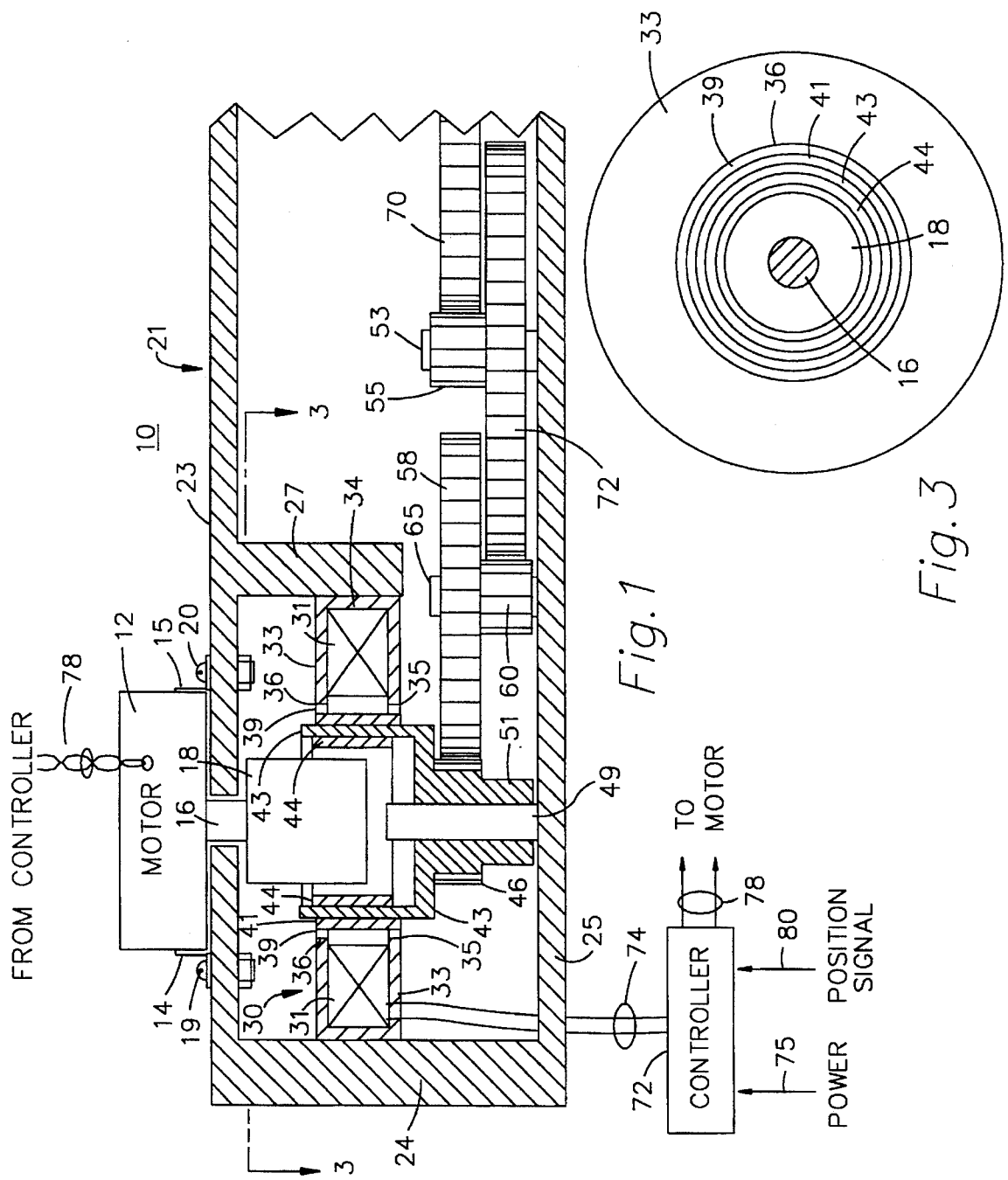
FIG. 1 is a section view of a part of an actuator incorporating the invention, and shows the gear train engaged with the motor.

FIG. 1 shows the details of the invention as applied to an actuator 10. The elements of actuator 10 are mounted on and within a housing 21 which comprises a top deck 23, a side wall 24, and a bottom deck 25. Torque for operating the actuator 10 and rotating a load not shown is supplied by a motor 12. Motor 12 is mounted by brackets 14 and 15 forming a part of the case of motor 12. Brackets 14 and 15 are attached to an outer surface of housing 21 on top deck 23 by machine screws and bolts 19 and 20.

Motor 12 has a shaft 16 extending through an opening in top deck 23. Shaft 16 has fixed to it a cylindrical armature 18 formed of a high remanence magnetic material which is magnetized so as to create alternating north and south poles around its periphery. Armature 18 along with a hysteresis cup 43 form a magnetic hysteresis slip clutch which allows transfer of a precisely limited amount of torque from armature 18 to cup 43. Cup 43 has a circularly cylindrical exterior and interior, with its interior diameter slightly exceeding the diameter of armature 18. The part of cup 43 which yields its shape and rigidity is formed of a nonmagnetic material such as high strength plastic. The cylindrical interior of cup 43 conventionally comprises a hysteresis layer 44. Layer 44 is formed of a magnetic hysteresis material in which is created a magnetic pattern under the influence of an external magnetic field varying in strength and polarity. The magnetic hysteresis material in which is formed such a pattern is attracted to the generator of such a field as the generator moves with respect to the hysteresis material. A known type of such a hysteresis material is a FeCrCo alloy formed according to a proprietary process and currently available under the trade name "Arnokrome III" from Arnold Engineering Co., Marengo, Ill. 60152. A further feature of cup 43 is an exterior cylindrical layer which comprises a pole piece or member 41 formed of a low reluctance magnetic material such as soft iron. Pole piece 41 has a predetermined axial dimension, and is axially positioned on the exterior of cup 43 in a position to be explained in more detail below.

Figure 2:
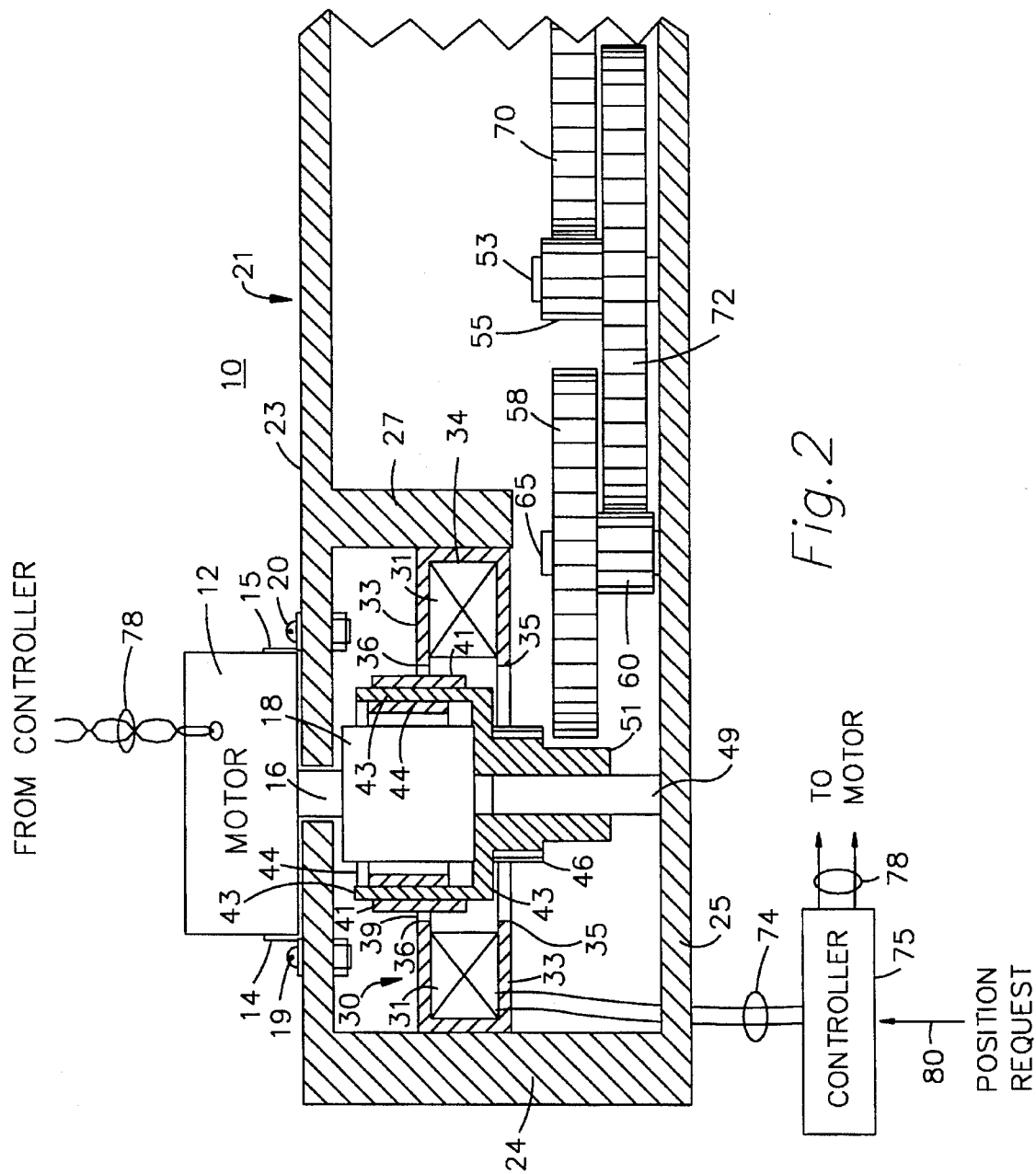
FIG. 2 is a section view similar to that of FIG. 1, of a part of an actuator incorporating the invention, and shows the gear train disengaged from the motor.

Cup 43 has a bottom which includes a hub portion 51 mounted for rotation on a shaft 49 fixed to bottom deck 25. Cup 43 can also slide axially on shaft 49 between a first position which cup 43 occupies as shown in FIG. 1 and a second position as shown in FIG. 2. Hub portion 51 also includes an integral first gear 46 formed in the hub portion adjacent and external to the enclosed volume of cup 43. In the first position of cup 43 shown in FIG. 1, gear 46 is fully in mesh with a relatively larger second gear 58 which forms the first gear of a gear train which reduces the speed and increases the torque of motor 12 to a level which allows the actuator 10 to operate a relatively heavy load. In the second position of cup 43 shown in FIG. 2, first gear 46 is completely out of mesh with second gear 58. Second gear 58 is concentric with and fixed to a relatively smaller third gear 60, both of which are mounted for rotation on a shaft 65 which is fixed to lower deck 25. Gear 60 in turn meshes with a relatively larger gear 72 which is concentric with and fixed to a relatively smaller gear 55. Gears 55 and 72 are mounted for rotation on a shaft 53 which is fixed to deck 25. Gear 55 meshes with a gear 70 which continues the gear train through the appropriate number of stages to provide the torque amplification needed for the particular actuator design involved. The last gear in the gear train is mounted on the output shaft (not shown) of actuator 10. The device to be positioned is attached to the output shaft.

A toroidal electromagnet 30 concentrically surrounds cup 43 and comprises a winding 31 and an external core 33.

Electromagnet 30 is fixedly mounted between an end 24 of housing 21 and an internal feature 27. While electromagnet 30 is shown in cross section in FIGS. 1 and 2, the following explanation will refer to the elements as their actual three dimensional shapes. The core 33 has a U-shaped cross section as can be seen in FIGS. 1 and 2, and has a base comprising a ring 34 concentric with armature 18. Ring 34 has top and bottom edges at which are attached top and bottom annular flanges which extending at approximately right angles from the ring 34 toward the cup 43. The internal edges of the top and bottom flanges are adjacent to and face cup 43 and form pole faces 36 and 35 respectively, each pole face in three dimensions actually comprising a spaced apart concentric ring. Pole face 36 is visible on edge in FIG. 3. Current flow through the individual turns of winding 31 generates magnetic flux which flows radially through the top and bottom flanges of the core 33, and axially through the base section 34.

The position in which electromagnet 30 is mounted must be selected so that when cup 43 is in its first position (as shown in FIG. 1) the top and bottom edges of pole piece 41 are closely juxtaposed respectively to pole faces 35 and 36 and form annular flux gaps between each pole face 35 or 36 and the adjacent edge of pole piece 41. Annular flux gap 39 is defined between pole face 36 and pole piece 41. When cup 43 is in its second position, the flux gap adjacent pole face 35 is dramatically lengthened, and little flux can flow directly through this gap because of its length.

Operation of actuator 10 is mediated by a controller 72 which receives operating power for itself and the mechanical elements from a power connection 75. The external apparatus of which actuator 10 forms a part provides a position signal on a path 80 which specifies the position desired for the output shaft of actuator 10 at a particular instant. Controller 72 then provides a drive current to motor 12 on paths 78 which causes motor 12 to rotate, with the polarity or phase of the drive current controlling the direction in which motor 12, and consequently the output shaft, rotates.

Controller 72 also provides DC power to winding 31 of electromagnet 30. When winding 31 receives power, magnetic flux flows through core 33, attracting pole piece 41 and urging cup 43 into its first position, the minimum reluctance position for the magnetic circuit comprising core 33 and pole piece 41. Winding 31 generates flux sufficient to overcome the axially-directed attraction of the magnetic armature 18 for layer 44, and pulls cup 43 into its first position. For most efficient operation, pole piece 41 should have an axial length approximately equal to the spacing between the top and bottom flanges of core 33. When pole piece 41 has an axial length nearly equal to the spacing between the top and bottom flanges of core 33, the minimum reluctance position for the magnetic circuit is achieved only when the cup 43 is in its first position. There are a number of design choices which will insure that when power is applied to winding 31, cup 43 is reliably pulled into its first position where gear 46 is fully in mesh with second gear 58, and then maintained in this position. For example, a mechanical stop can be provided which defines the first position for cup 43, and which prevents cup 43 from shifting into the minimum reluctance position. Instead, such a mechanism will simply provide that the first position of cup 43 provides for reluctance in the magnetic circuit which is much less than that present when cup 43 is in its second position.

In general, during normal operation, controller 72 will maintain continual power to winding 31, keeping cup 43 in its first position and first gear 46 in mesh with second gear 58. This allows motor 12 to serve as a brake preventing movement of the output shaft even if a dynamic torque load is present on the output shaft. One example of such a load might be an air duct damper having blades which fall under the force of gravity into the closed position when torque is absent from its control shaft. Another type of load might be the return spring forming a part of certain actuator designs.

The return spring feature of some actuators is in fact the motivation of this invention. As was explained earlier, when power is lost, it is necessary to return many actuator loads to a preferred position. However, certain types of motors have cogging torque, and resist external torque applied to their shafts. If a return spring is used to provide return torque for the output shaft, the motor 12 will resist its return torque. However, actuators which incorporate this invention avoid this problem. When power is lost to controller 72, power is no longer provided to winding 31, and cup 43 is no longer attracted into its first position, where gear 46 is in mesh with gear 58. Instead, the axially-directed magnetic attraction between the armature 18 and the layer 44 urges cup 43 into its second position where gear 46 is out of mesh with gear 58, allowing the gear train to turn as freely as the inherent friction therein permits when torque is applied to the output shaft.

FIG. 3 shows the relative shapes and positions of the elements of the coupling between motor 12 and gear 58 in a cross section view taken parallel to the axis of shaft 16. One can see the circular shape of armature 18 around whose periphery alternating north and south magnetic poles are present. A small clearance space separates the outer surface of armature 18 from the hysteresis layer 44. The nonmagnetic cup 43 and magnetic pole piece 41 form successive rings outside of layer 44. The magnetic flux gap 39 separates pole piece 41 from the pole face 36 of the top flange of core 33.

Figure 4:
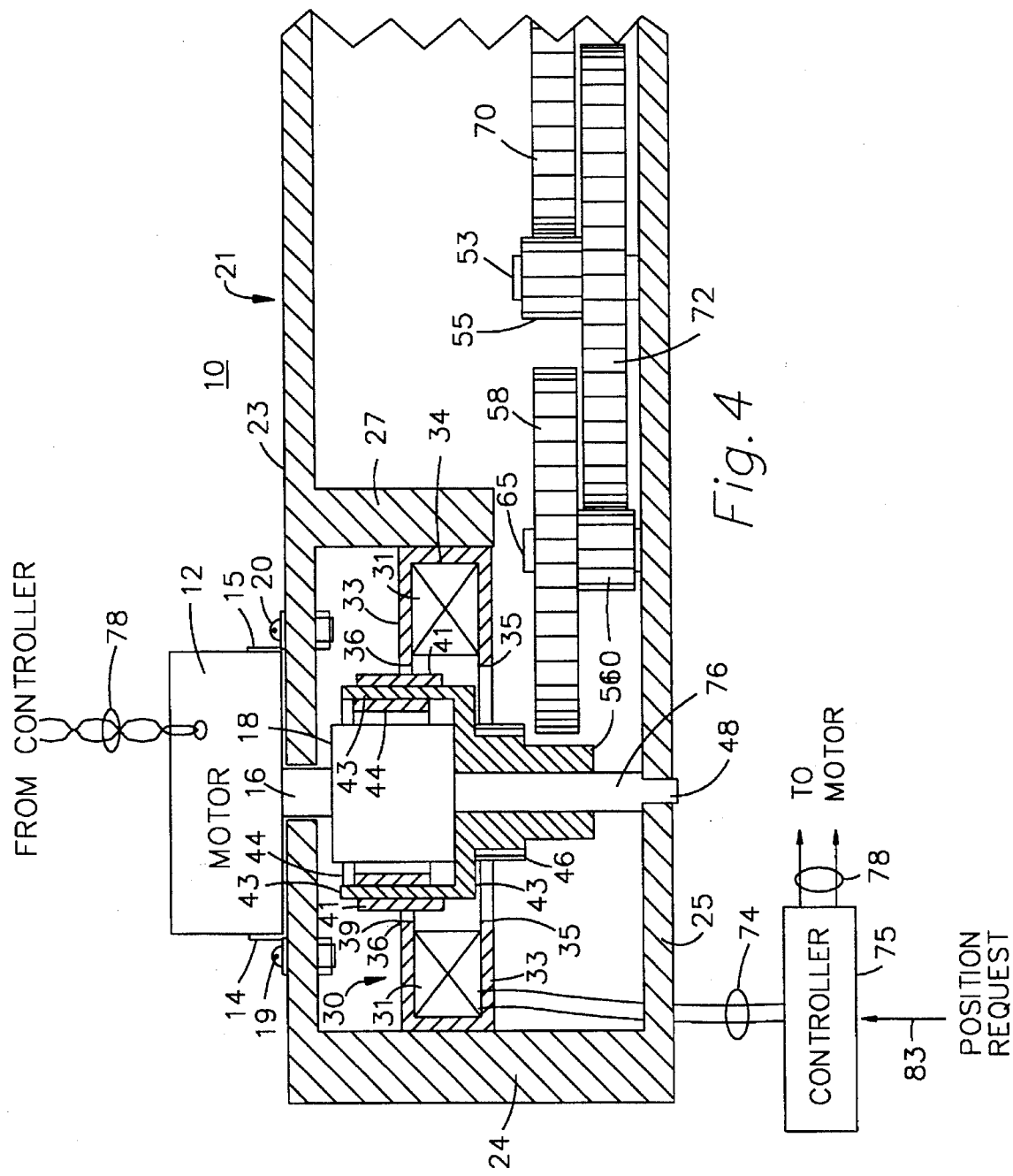
FIG. 4 is an alternative arrangement for the mounting of the armature and cup assembly.

FIG. 4 shows a slightly different arrangement for supporting cup 43. In this embodiment, shafts 16 and 49 of FIGS. 1 and 2 are replaced with a single shaft 76 which extends from top deck 23 to bottom deck 25. A bearing 48 supports the end of shaft 76 for rotation in deck 25. Cup 43 is carried on shaft 76 for both translation between its first and second positions and also for rotation. This design avoids the cantilevered arrangement for the shaft 16 shown in FIGS. 1 and 2 which may lead to higher loads on its bearings. The presence of bearing 48 at the very end of shaft 76 minimizes radial runout which may affect the clearances in the clutch and the positioning of gear 46 with respect to gear 58. Further, the speed of rotation of cup 43 relative to the shaft which carries it is substantially reduced in this embodiment because the motor shaft will be turning in the same direction as is the cup, and the relative rotation will be equal only to the slippage speed in the clutch, which may be zero when the clutch (and actuator 10) is not overloaded.

The embodiments of an invention in which an exclusive property or right is claimed are defined as follows:

1. An electrically controlled torque transfer mechanism for selectively transferring torque between a first shaft mounted for rotation on a housing, through a magnetic hysteresis slip clutch to a second gear mounted for rotation on the housing, said slip clutch comprising a magnetized armature mounted on the first shaft and fixed thereto, and a hysteresis layer within a cylindrical cup having an axis and surrounding the magnetized member and in torque-transferring relation thereto, said cup mounted for rotation about its axis with respect to the housing, wherein the improvement comprises means mounting the cup for allowing axial translation of the cup between first and second positions, a first gear concentric with the first shaft and fixed to the cup for axial translation therewith and meshing with the second gear when the cup is in its first axial position and out of mesh with the second gear when the cup is in its second axial position, said cup including a magnetic member externally fixed thereto, and said torque transfer mechanism further comprises in juxtaposition to the magnetic member, an electromagnet generating magnetic flux flowing through a flux path when energized, said electromagnet positioned to include in its flux path the external magnetic member, said magnetic flux urging the cup into one of the first and second axial positions when said electromagnet is energized.

2. The torque transfer mechanism of claim 1, wherein the electromagnet is axially positioned to provide magnetic flux urging the drag cup into its first axial position.

3. The torque transfer mechanism of claim 2, wherein the magnetic member concentrically surrounds the cup's exterior.

4. The torque transfer mechanism of claim 3, wherein the electromagnet concentrically surrounds the magnetic member.

5. The torque transfer mechanism of claim 4, wherein the electromagnet includes a pole piece having an annular flux gap, said electromagnet axially positioned to place the flux gap adjacent the magnetic member when the cup is in its first axial position.

6. The torque transfer mechanism of claim 5, wherein the electromagnet is toroidally shaped and includes a winding with circumferential turns, and the pole piece has a toroidal shape surrounding the winding with its flux gap facing inwardly.

7. The torque transfer mechanism of claim 6, wherein the flux path created by the pole piece and the magnetic member has an air gap between the pole piece and the magnetic member, and wherein the length of the air gap is greater when the cup is in its second position than when in its first position.

8. The torque transfer mechanism of claim 1, wherein the electromagnet concentrically surrounds the cup.

9. The torque transfer mechanism of claim 7, wherein the electromagnet includes a pole piece having an annular flux gap, said electromagnet axially positioned to place the flux gap adjacent the magnetic member when the cup is in its first axial position.

10. The torque transfer mechanism of claim 8, wherein the electromagnet is toroidally shaped and includes a winding with circumferential turns, and the pole piece has a toroidal shape surrounding the winding with its flux gap facing the first shaft.

11. The torque transfer mechanism of claim 1, wherein the magnetic member is positioned relative to the armature for magnetic attraction thereto urging the cup toward its second position and the electromagnet is positioned to, when energized, provide magnetic flux attracting the magnetic member and urging the cup towards its first position.

12. The torque transfer mechanism of claim 10, wherein the magnetic member magnetically urges the cup toward its second position with a preselected force when the cup is in its first position, and wherein the weight of the cup and the elements attached thereto is less than the preselected force.

13. The torque transfer mechanism of claim 1, wherein the first shaft carries the cup and first gear for relative rotation with respect thereto.

14. The torque transfer mechanism of claim 12, wherein the first shaft has a first end mounted for rotation adjacent a first panel of the housing and a second end mounted for rotation in a second panel spaced from the first panel.

* * * * *